United States Patent Office 3,032,231
Patented May 1, 1962

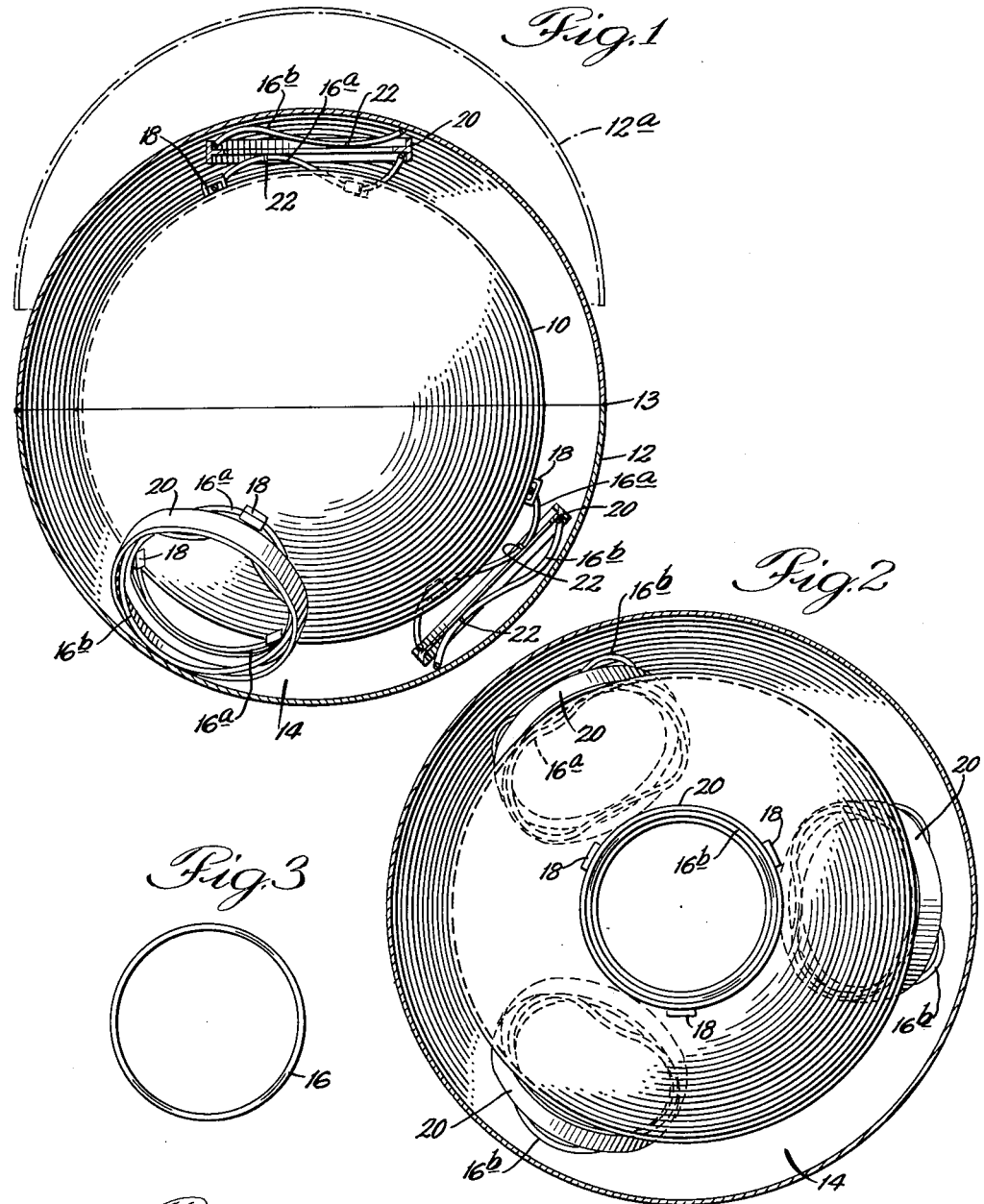

3,032,231
SUSPENSION SYSTEM FOR INSULATING
CONTAINERS
Samuel K. Clark, Ann Arbor, Mich., and George S. Kiester, Bryan, Ohio, assignors to The Aro Corporation, a corporation of Ohio
Filed Nov. 9, 1959, Ser. No. 851,747
7 Claims. (Cl. 220—15)

This invention relates to an improved suspension system for thermal insulating containers of the dual wall vacuum type which are commonly used in aircraft, as part of a liquid oxygen converter system, for storing liquid oxygen. The oxygen is permitted to volatilize from the liquid to the gaseous state under controlled conditions imposed by the system and is conducted through suitable conduits to the operating personnel to assist in breathing at elevated temperature. Liquid oxygen must be maintained at a temperature below its volatilizing point of −297° F. and, consequently, it is essential that the container be well insulated so that conversion to the gaseous state is effected only when gaseous oxygen is required. It is also essential that the container be sufficiently rugged to withstand vibration and severe acceleration loadings to which it is subjected in high speed aircraft.

The primary object of the present invention is to provide a thermal insulating container of the vacuum type which has improved resistance to vibration and shock, and in which the inner container moves relatively small distances under imposed acceleration.

Another object is to provide a construction of this kind in which the vacuum space between the double walls is considerably reduced without increasing the thermal conductivity.

In a preferred form, the container of a liquid oxygen system comprises two spheres—an inner sphere which houses the liquefied gas and an outer sphere spaced therefrom in which the inner sphere is suspended. The annular space between the concentric spheres is evacuated to provide good thermal insulation for the content of the inner container. The mounting for the inner container, to which this invention is directed, must have a number of desired features: good, controllable spring constant properties in the vertical direction and in any two arbitrary but mutually perpendicular horizontal directions; good, controllable dry friction properties in both said directions; small thickness so that the evacuated annular space between the spheres is maintained at a minimum; ease of manufacturing and assembly, and maximum thermal resistance.

We have found that these qualities can be obtained by disposing at several points in the annular space between the spheres spring suspension means comprising a circular wire wave washer. The wave washer preferably constitutes an undulating wire, the undulations of which are in a direction normal to the general plane of the circular washer. Such washers are designed so that the inner container, as suspended, has a low natural frequency, since the low frequencies result in the most isolation of the inner container from the outer shell. High stresses in the suspension system springs put a lower limit on the natural frequency of about 10 cycles per second. Using this frequency it may be calculated that the magnitude of the dry friction force which must be generated to prevent motion in any given direction is 0.36 times the weight of the suspended inner bottle.

To meet these design conditions the springs are arranged with one at the top of the container and three others spaced at 120° intervals on a circle below the circular equator of the container. The springs are slightly preloaded to hold the bottle against upward motion. All are in compression.

The spring suspension means may include more than one circular wire wave washer. Two may be used in series separated by a suitable ring to hold them in proper spaced relation. The washer adjacent the inner container is threaded through channels which are welded on the outer surface of the inner container and serve to hold the washer in the desired position.

Referring now to the drawings which illustrate the preferred form of the invention, FIGURE 1 is a vertical sectional view taken through a spherical liquid oxygen container showing the springs in their predetermined positions;

FIGURE 2 is a plan view of the container shown in FIGURE 1;

FIGURE 3 is a plan view of one of the wave washers; and

FIGURE 4 is a side elevation of the washer shown in FIGURE 3.

The inner container 10 and the outer shell 12 are spheres made from stainless steel which are fabricated in two halves and joined along a circumferential weld 13. The walls forming the annular space 14 between the containers are copper flashed and the space is evacuated to provide good thermal insulating properties. The inner container 10 is spaced from the outer container 12 by means of a damping spring assembly consisting of a plurality of circular wire wave washers 16. In the form of the invention shown in the drawing, there are four identical wave washer assemblies comprising two washers each. One is mounted at the north pole and the other three are centered 120° apart on a circle below the equator and parallel thereto.

Each washer 16 is made from stainless steel spring wire or other acceptable high strength alloy and preferably has three waves. Theoretically, two waves would provide improved performance but three waves provide a stable ring and are used as a practical matter. The diameter of the wire and the size of the undulations will depend, of course, upon the size of the container and the weight of the material to be stored therein. For a 5 liter liquid oxygen container we have found a 3″ diameter washer made from .040″ diameter stainless steel wire to be very satisfactory. The effective thickness of the washer is about ¼″. It will be appreciated, therefore, that the undulations are shallow as compared with the diameter of the washer. The inner ring 16a may be threaded through channels 18 which are welded to the outer surface of the inner container 10. This holds the washer 16a in the desired position. We have found that each of the three lower damping spring assemblies should be located at an angle of about 45° below the equator. This produces a spring constant in which the natural frequency of the inner container 10 is the same for any direction of motion. A spacer ring 20, T-shaped in cross section, is secured to the ring 16a by a wire loop 22 and the edge of the washer rests in the L-shaped ledge provided by the spacer. Another ring 16b rests in a similar L-shaped ledge on the opposite side of the spacer and is secured thereto by means of another wire loop or ring 22. The crest of each of the three undulations in the wave washer rests against the inside of the outer sphere 12. Each of the damping spring assemblies is constructed in an identical manner. The spring assemblies are slightly preloaded when the container is empty.

The outer shell 12 is made in two halves. The inner container is assembled with the lower half, the damping spring assemblies being mounted in the proper position during this assembly operation. The fourth spring assembly is connected to the top of the inner container 10 in the manner previously described. The top half of the sphere 12 is then put over the inner container and the springs are all slightly compressed as the shell is welded about its circumferential equator.

It will be appreciated that more than two wave washers may be in a spring assembly. Likewise, if desired, a single wave washer may be used. We have found that by using them in multiples, individual wave spring working stresses are greatly reduced, resulting in less spring fatigue and resistance to thermal conduction is more advantageous. It will be appreciated that the conductive path as measured by the length-to-area ratio is long. In other words, the wire is quite thin so that it does not provide a broad avenue of conductivity and the distance through which the heat must travel is relatively long. Furthermore, the contact area between the wave washer and the inner and outer spheres is very small. Thus, conductivity of heat to the low temperature contents is reduced to a minimum. Because the wave washers are shallow, i.e. the undulations do not project a considerable distance above the central plane of the washer, the space between the inner and outer spheres can be maintained at a minimum.

Other modifications of the invention will occur to those skilled in the art and it is our intention to include all such modifications which may reasonably be construed to be within the scope of the appended claims as part of our invention.

What we claim as new and desire to secure by Letters Patent of the United States is:

1. In a thermal insulating container comprising an inner sphere suspended in an outer sphere, the suspension construction comprising damping spring means disposed substantially in planes normal to a radius of said spheres between said spheres at spaced locations and bearing against the opposed surfaces of said spheres, each said means comprising at least one circular wire wave washer having three undulations normal to the plane of the washer, said undulations being of shallow dimension as compared with the diameter of the washer.

2. A thermal insulating container comprising an inner sphere suspended within an outer sphere, the space between said spheres being evacuated, a plurality of damping spring assemblies disposed within said space substantially in planes normal to a radius of said spheres for yieldably supporting said inner sphere, each said assembly comprising a pair of circular wire wave washers separated by a spacer ring, said washers having undulations normal to the plane of the washer, and means for securing one of said wave washers of each pair to said inner sphere.

3. The container of claim 2 which has four spring assemblies, one at the top of the inner sphere and three equally spaced from each other on a circle below the equator of the inner sphere.

4. The container of claim 3 wherein said circle is located 45° from said equator.

5. The container of claim 2 in which said securing means consists of channel members embracing said washers.

6. The container of claim 2 in which said spacer ring is T-shaped in cross section and said wave washers on either side thereof are fixed to said ring.

7. The container of claim 2 in which each said wave washer has three undulations of shallow dimension as compared with the diameter of the washer.

References Cited in the file of this patent

UNITED STATES PATENTS

| 991,410 | Altenberg et al. | May 2, 1911 |
| 1,771,012 | Schwartz | July 22, 1930 |

FOREIGN PATENTS

| 794,835 | Great Britain | May 14, 1958 |